W. WICKERT, Jr.
VALVE.
APPLICATION FILED OCT. 3, 1914.

1,216,528.

Patented Feb. 20, 1917.

Witnesses:

Inventor
William Wickert Jr.
Parker & Carter
his Attys.

UNITED STATES PATENT OFFICE.

WILLIAM WICKERT, JR., OF CHICAGO, ILLINOIS.

VALVE.

1,216,528.  Specification of Letters Patent.  Patented Feb. 20, 1917.

Application filed October 3, 1914. Serial No. 864,723.

*To all whom it may concern:*

Be it known that I, WILLIAM WICKERT, Jr., a citizen of the United States, residing at Chicago, in the county of Cook and State of Illinois, have invented a certain new and useful Improvement in Valves, of which the following is a specification.

This invention relates to valves and has for its object to provide a new and improved device of this description. One of the objects of my invention is to provide a valve arranged so that the wear of the valve and the valve seat will be eliminated or reduced, so as to prevent leakage and greatly increase the life of the valve. In valves, for example, which are used in connection with oils of any kind, the opening and closing of the valve causes wear upon the two engaging parts of the valve and this wear is greatly increased by sand, grit or dirt which gets into the valve and which is always present under such conditions. This wear causes leakage past the engaging parts of the valve, particularly where the liquid is under pressure. The invention is illustrated in the accompanying drawings wherein—

Like numerals refer to like parts throughout the several figures.

Figure 1:
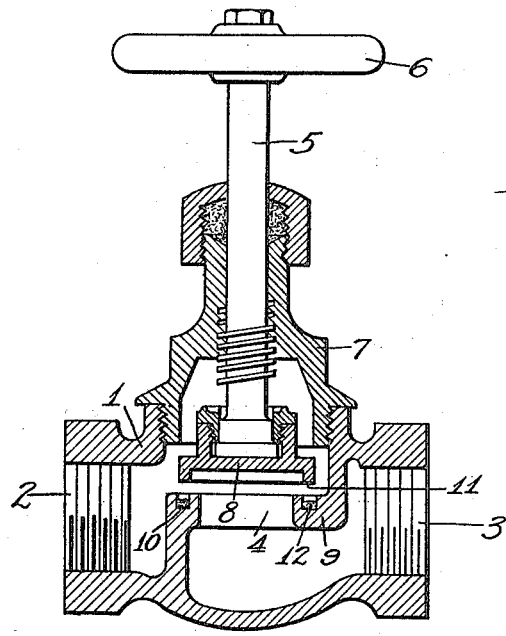
Figure 1 is a sectional view showing one form of valve embodying the invention.
Figure 2:
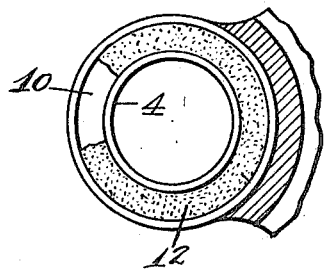
Fig. 2 is a face view of one of the engaging parts of the valve.
Figure 3:
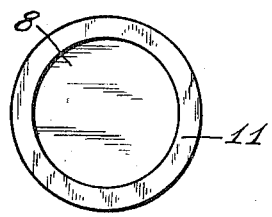
Fig. 3 is a face view of the other engaging part of the valve.

In the drawings I have illustrated one form of valve in order to make my invention clear. In this form there is a valve casing 1, which is provided with the inlet 2 and the outlet 3. Between the inlet and the outlet is a controlled connecting opening 4. This opening is controlled by a movable part 5, which in the present case is shown as a threaded part and is controlled by the hand wheel 6, said part being threaded into a threaded opening in the upper part 7 of the casing. One of the engaging parts 8 of the valve is connected with the movable part 5 and the other engaging part 9, is associated with the opening 4, the engaging part 9 is provided with a groove 10, which surrounds the opening 4 and the engaging part 8 is provided with an annular projection or rib 11 which is located opposite the groove 10, and which preferably projects into the groove. This groove 10 contains a soft packing 12 of solid, that is, non-fluid material and the annular projection 11 engages this packing. When the valve is used in connection with oil this packing is saturated with an oil repellent. For example, a suitable packing may be made from asbestos treated with fish glue and glycerin. Any other suitable oil repellent may be used. It is desirable to have the soft packing treated with something that is not soluble in the liquid with which the valve is used, for otherwise said liquid would be liable to leak through.

I have found that when this liquid repellent is used with the soft packing there is no leakage and the grit or sand in the liquid does not affect the valve because the valve may be pressed down so that the engaging parts over-lap and the repellent quality of the soft packing prevents the liquid from leaking through it. It is, of course, evident that the valve may be used in any desired connection and with any desired material.

The packing 12, may be made of any desired material and removable so that when it becomes worn or compressed to too great an extent, it may be removed and replaced by a new packing.

It will be seen that with this packing the movable part of the valve may be screwed down tight, the packing giving so as to permit a thoroughly tight joint to be made. It will also be seen by this construction that the valve itself will last for many years.

I have described in detail a particular construction but it is, of course, evident that this construction may be varied without departing from the spirit of my invention, and I therefore, do not limit myself to the construction shown.

In using the term "solid" as applied to the material used in the packing, I used such term in its sense as opposed to fluid.

I claim:

1. A valve comprising a casing having an inlet and an outlet, a controlled opening connecting said inlet and outlet, two engaging parts by which said opening is controlled, one of said parts provided with a groove and the other provided with a projection opposite said groove, a soft asbestos packing in said groove containing a liquid repellent, said projection engaging said soft packing when the valve is closed.

2. A valve comprising a casing, two engaging parts within said casing, one movable and one fixed for controlling the flow of liquid through the valve, one of said engaging parts provided with a groove, a soft liquid repellent packing having a body of solid material in said groove, and an annular projection on the other part adapted to engage said packing.

3. A valve comprising a casing having an inlet and an outlet, a movable part for controlling the passage of material through said valve, an opposed part toward and from which said movable part moves, one of said parts provided with a groove, an oil repellent pressure resisting packing in said groove, the other part engaging the said packing when the valve is closed.

4. A valve comprising a casing having an inlet and outlet, a movable part for controlling the passage of material through said valve, an opposed part toward and from which said movable part moves in opening and closing the valve, one of said parts provided with a groove, an oil repellent packing in said groove consisting of asbestos, fish-glue and glycerin, the other part engaging the said packing when the valve is closed.

In testimony whereof, I affix my signature in the presence of two witnesses this twenty-second day of September, 1914.

WILLIAM WICKERT, Jr.

Witnesses:
 WILLIAM LAEMMER,
 ADOLPH PETERSON.

Copies of this patent may be obtained for five cents each, by addressing the "Commissioner of Patents, Washington, D. C."